Aug. 13, 1940.　　　　H. C. BOWEN　　　　2,211,639
AUTOMATIC ADJUSTER
Filed Feb. 8, 1939

INVENTOR.
HERBERT C. BOWEN
BY
ATTORNEY.

Patented Aug. 13, 1940

2,211,639

UNITED STATES PATENT OFFICE 2,211,639

AUTOMATIC ADJUSTER

Herbert C. Bowen, Detroit, Mich., assignor to Hydraulic Brake Company, Detroit, Mich., a corporation of California Application February 8, 1939, Serial No. 255,352

7 Claims. (Cl. 188—79.5)

This invention relates to motor vehicle brakes, and more particularly to means for automatically adjusting the friction elements of vehicle brakes.

The invention comprehends a simple and inexpensive automatic adjuster for the braking element of a brake, operative to compensate for wear of the friction lining on the braking element.

An object of the invention is to provide an automatic adjuster for a brake controlled by wear of the friction lining on the braking element of the brake, and operative to adjust the braking element proportionately to the wear on the lining thereof.

Other objects and advantages of the invention will appear from the following description taken in connection with the accompanying drawing forming a part of this specification, and in which—

Figure 1:
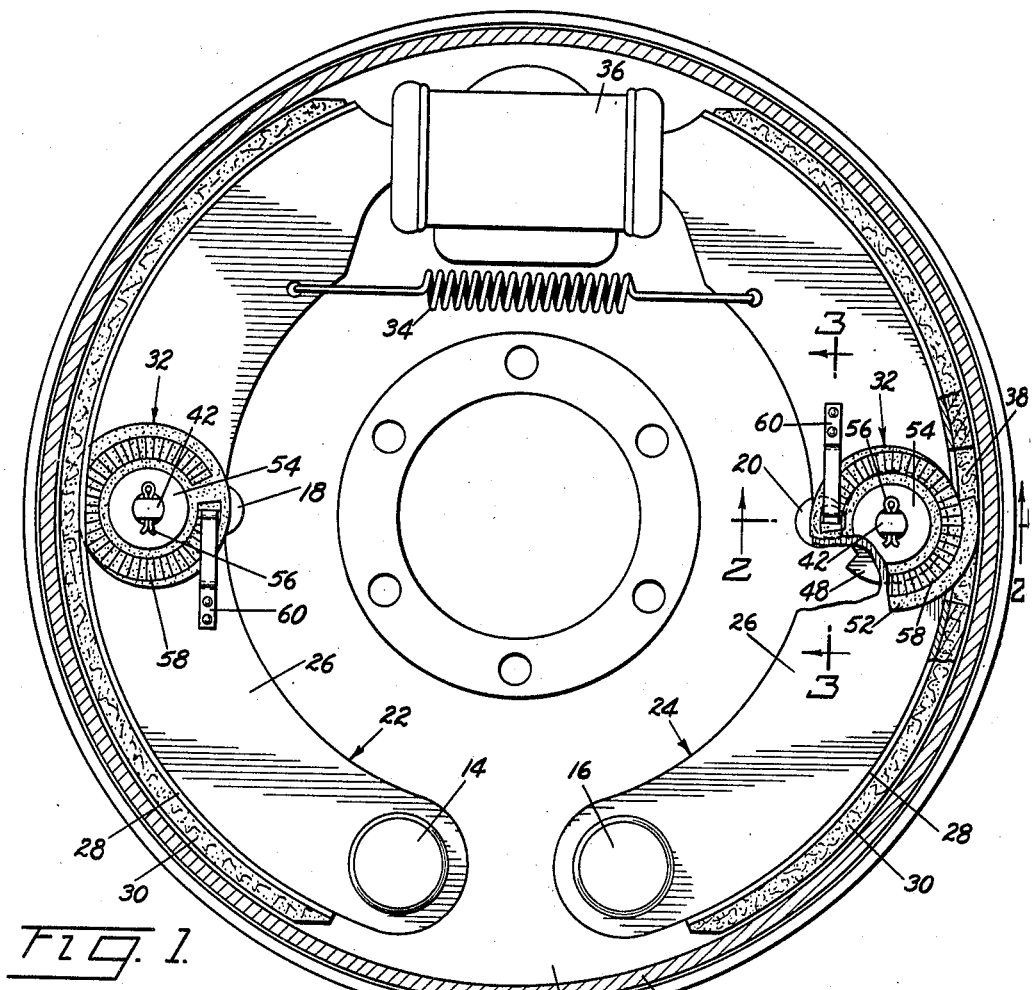
Fig. 1 is a vertical sectional view of a brake illustrating the invention as applied.
Figures 2, 3:
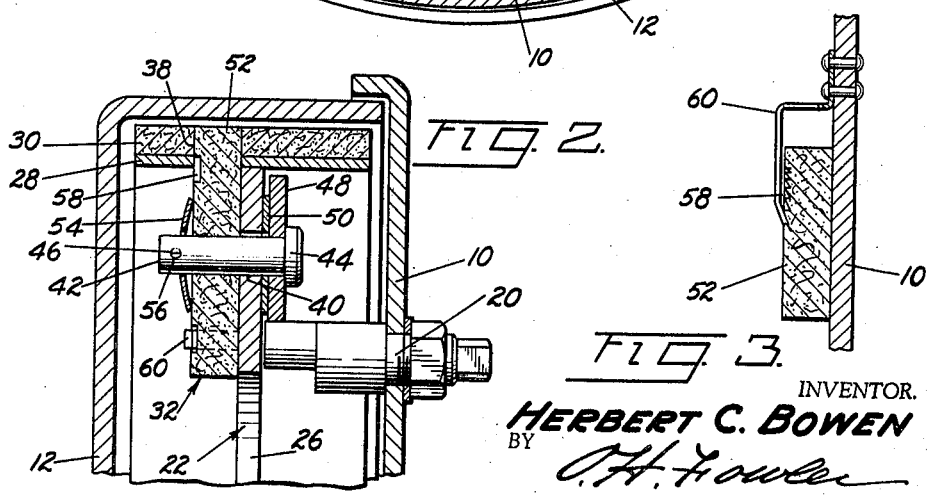
Fig. 2 is a sectional view substantially on line 2—2.
Fig. 3 is a sectional view, substantially on line 3—3, Fig. 1.

Referring to the drawing for more specific details of the invention, 10 represents a fixed support for backing plate adapted to be secured to an axle or to an axle housing, and 12 represents a rotatable drum associated with the backing plate and adapted to be secured to a wheel. The backing plate has arranged thereon a pair of spaced anchors 14 and 16 and a pair of corresponding retractile stops 18 and 20.

A pair of corresponding interchangeable braking elements or shoes 22 and 24 are supported on the backing plate. Each of the shoes includes a web 26 supporting a rim 28 having suitably secured thereto a friction lining 30. The shoes have their articulate ends pivoted on the anchors 14 and 16, and automatic adjusters 32 mounted on the shoes cooperate with the retractile stops 18 and 20 for supporting the shoes in proper spaced relation to the drum when the shoes are at rest or in retracted position.

The shoes are connected adjacent their force applying ends by a retractile spring 34, and a fluid pressure actuated motor 36 mounted on the backing plate between the shoes is suitably connected to the force-applying ends of the shoes. The motor 36 is operative to move the shoes into engagement with the drum against the resistance of the retractile spring 34.

Each of the shoes 22 and 24 has a slot 38 in its rim 28 and lining 30, and the web 26 of the shoe is provided with a transverse bore 40. A stub shaft or bolt 42 mounted for rotation in the bore 40 has a head 44 and a diametral bore 46 adjacent its end. A cam 48 sleeved on the bolt 42 between the head thereof and the web 26 of the shoe is suitably secured against rotation on the bolt as by a conventional flat on the bolt, and a suitable spacer 50 is interposed between the cam and the web. The lobe of the cam 48 cooperates with the retractile stop 20 for determining the position of the shoe with relation to the drum.

A relatively large cam 52, preferably formed from a friction material having a lower coefficient of friction than the lining on the shoes, is fitted on the bolt 42 and suitably secured against rotation thereon by the flat. The cam 52 is held against displacement by a spring-washer 54 sleeved on the bolt and secured in place by a cotter-pin 56 inserted in the diametral bore 46 in the end of the bolt. The spring-washer 54 serves to clamp the cams 48 and 52 to the respective sides of the web 28 of the shoe with at least sufficient pressure to inhibit rattling. The lobe of the cam 52 is movable in the slot 38 in the rim and lining of the shoe. The pitch line of the cam 52 corresponds to that of the cam 48 and is in reverse with relation thereto, so that as the pitch line of the cam 52 drops, the pitch line of the cam 48 raises. The cam 52 has stamped or otherwise formed on one side thereof a circular ratchet 58, the center of which is in the axis of the cam, and a spring 60 secured to the web of the shoe cooperates with the ratchet for inhibiting retrograde movement of the cam.

In a normal operation, upon energization of the motor 36, the friction elements 22 and 24 are moved from their retracted position into engagement with the drum 12 against the resistance of the retractile spring 34 to retard rotation of the drum. This operation results in wear on the friction lining 30 on the shoes, and this wear of the friction lining inherently causes maladjustment of the shoes with relation to the drum when the shoes are in retracted position.

In the present invention, as the linings 30 on the shoes wear, due to friction induced by the wiping action of the rotating drum, the cam 52 engaging the drum simultaneously with the linings 30 is slightly rotated on its axis in the direction where the pitch line of the cam gradually recedes or drops. The cam 52 is keyed to the shaft or bolt 42, and, accordingly, this movement of the cam is transmitted to the shaft. The cam 48 is also keyed to the shaft 42, hence the cams 48 and 52 move concomitantly. The pitch lines of the cams correspond, and are reversely disposed with relation to one another. Accordingly, as the pitch line of the cam 52 drops, the pitch line of the cam 48 raises, and this movement of the cams is proportionate to the wear on the linings 30, hence, upon concluding a braking operation and return of the shoes to retracted position, the cams 48 engage the retractile stops 20 and serve to support the shoes in proper spaced relation to the drum.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a rotatable drum, a friction element for cooperation therewith, a retractile stop associated with the friction element, and a group of cams on the friction element for cooperation with the drum and stop.

2. A brake comprising a rotatable drum, a friction element for cooperation therewith, a retractile stop for the friction element, and a rotatable unit on the friction element including a cam surface for cooperation with the drum and another cam surface for cooperation with the stop.

3. A brake comprising a rotatable drum, a friction element for cooperation therewith, an adjustable retractile stop for the friction element, a unit mounted for rotation on the friction element including a cam for cooperation with the drum and another cam for cooperation with the stop.

4. A brake comprising a rotatable drum, a friction element for cooperation therewith, an adjustable stop for the friction element, and a unit mounted for rotation on the friction element including a cam for cooperation with the drum and another cam of the same pitch line for cooperation with the stop.

5. A brake comprising a rotatable drum, a friction element for cooperation therewith, an adjustable retractile stop for the friction element, and a unit mounted for rotation on the friction element including a cam for cooperation with the drum and another cam for cooperation with the stop, said cams having corresponding pitch lines arranged reversely with relation to one another.

6. A brake comprising a rotatable drum, a friction element for cooperation therewith, a stop for the friction element, a shaft mounted for rotation on the friction element, a cam on the shaft for cooperation with the drum, and another cam on the shaft for cooperation with the stop, said cams having their pitch lines arranged reversely to one another.

7. A brake comprising a rotatable drum, a friction element for cooperation therewith, a stop for the friction element, a rotatable shaft on the friction element, a cam on the shaft for cooperation with the drum, another cam on the shaft for cooperation with the stop, the cams having corresponding pitch lines arranged reversely to one another, means for retaining the cams on the shaft, and means providing against retrograde movement of the cams.

HERBERT C. BOWEN.